(12) United States Patent
Komatsu et al.

(10) Patent No.: US 6,543,922 B2
(45) Date of Patent: Apr. 8, 2003

(54) VEHICLE LAMP AND VEHICLE LAMP UNIT

(75) Inventors: Motohiro Komatsu, Shizuoka (JP);
Shoji Kobayashi, Shizuoka (JP);
Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 13 days.

(21) Appl. No.: 09/816,907

(22) Filed: Mar. 23, 2001

(65) Prior Publication Data

US 2001/0026454 A1 Oct. 4, 2001

(30) Foreign Application Priority Data

Mar. 23, 2000 (JP) .......................................... 2000-082952

(51) Int. Cl.$^7$ ................................................. F21V 7/00
(52) U.S. Cl. ........................ 362/518; 362/522; 362/523; 362/539
(58) Field of Search ................................. 362/517, 518, 362/521, 522, 523, 525, 543, 539

(56) References Cited

U.S. PATENT DOCUMENTS

| 5,645,338 A | | 7/1997 | Kobayashi | |
|---|---|---|---|---|
| 6,004,014 A | * | 12/1999 | Yamamura et al. | ......... 362/346 |
| 6,280,070 B1 | * | 8/2001 | Ishida et al. | ................ 362/284 |

* cited by examiner

Primary Examiner—Stephen Husar
Assistant Examiner—John Anthony Ward
(74) Attorney, Agent, or Firm—Koda & Androlia

(57) ABSTRACT

A lane mark irradiation lamp forming a pair of light distribution patterns on left and right sides of the road surface ahead of a vehicle. The light distribution patterns are formed so as to extend along the lane marks provided on the road, and the luminous intensity distribution of the light distribution patterns in lateral direction in a first angle position that is in a downward direction at a predetermined angle with respect to a longitudinal axis of the lamp is set so as to have peaks on both sides of such a longitudinal axis.

12 Claims, 9 Drawing Sheets

FIG. 2A  LOW BEAM

FIG. 2B  HIGH BEAM

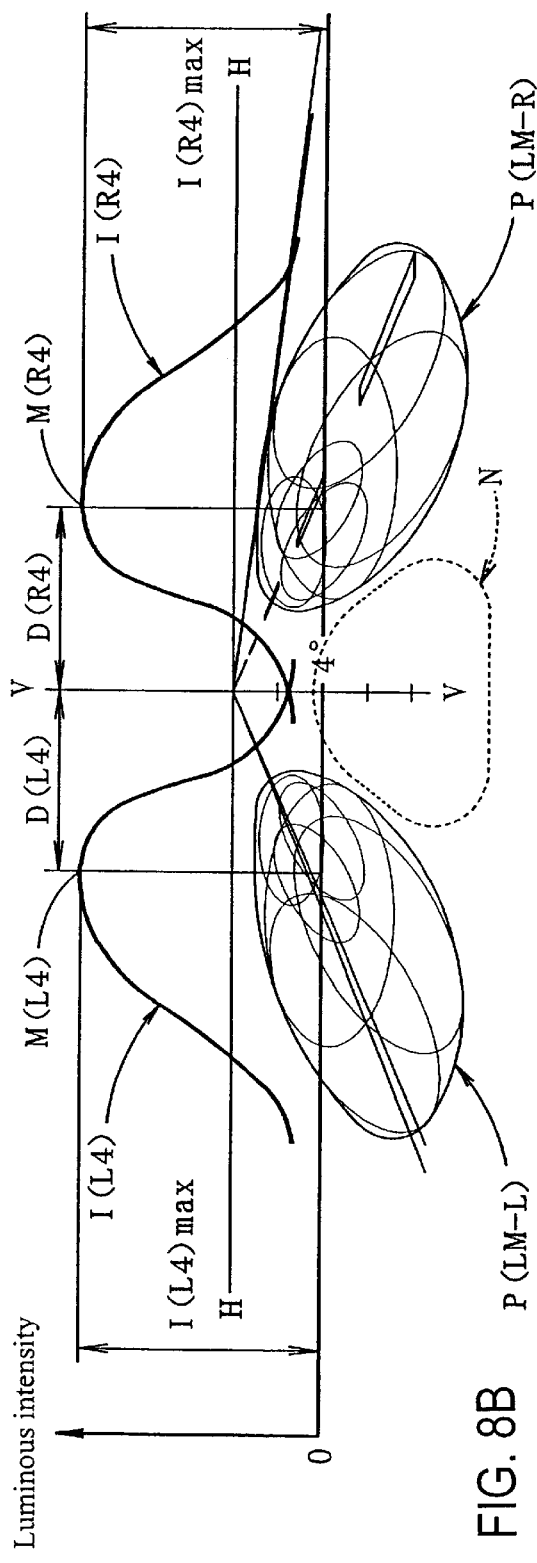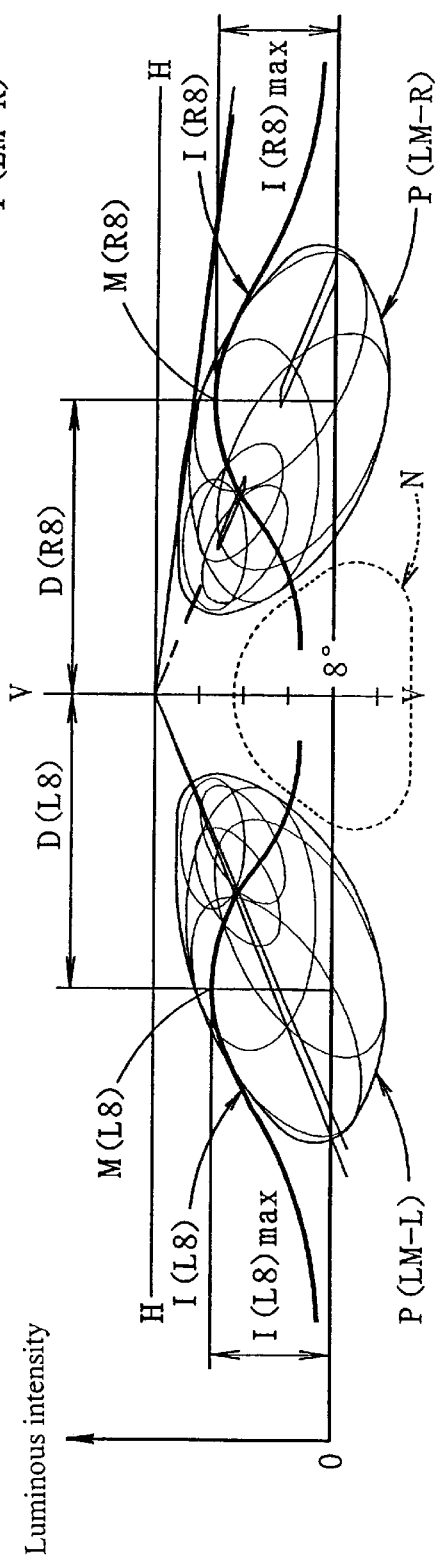
FIG. 8A
FIG. 8B

VEHICLE LAMP AND VEHICLE LAMP UNIT

BACKGROUND OF THE INVENTION

1. Field of the Invention

The present invention relates to a vehicle lamp and a vehicle lamp unit for irradiating a light beam forward under a predetermined light distribution pattern.

2. Prior Art

Generally, a headlamp for a vehicle is structured to irradiate light beam forward with a light distribution pattern that varies in accordance with a vehicle driving state. In other words, a conventionally known headlamp is switchable between the low beam light distribution pattern and the high beam light distribution pattern.

When a vehicle runs on the road in a wet condition in the rain, most of the forward irradiation light from the headlamp is reflected regularly on the road surface. This may reduce the reflective intensity light to the driver, thus deteriorating visibility with respect to the road surface forward of the vehicle, and hindering the driver from driving in good condition.

Generally, lane marks (i.e., a white line partitioning the vehicle lanes) are painted on a paved road. It is visible even on the wet road surface. Therefore, if the forward irradiation light amount from the headlamp is increased, it is possible to enhance the visibility of the lane marks, thus facilitating driving correspondingly.

However, the increase in the amount of the forward irradiation light from the headlamp emits glare to the driver of an oncoming vehicle. This may hinder the driver of the oncoming vehicle from driving in an appropriate condition.

Japanese Patent Application Laid-open (Kokai) No. H5-338487 discloses a vehicle lighting unit in which a forward road surface of a running vehicle is imaged, and the image is processed to detect the position of the lane marks. Then, an optical axis of the headlamp is turned to the direction of the lane marks based on the detection result. Such an apparatus may enhance the visibility with respect to the lane marks. However, glare to a driver of the oncoming vehicle cannot be reduced. In addition, the structure of such an apparatus is extremely complicated.

SUMMARY OF THE INVENTION

The present invention solves the foregoing problems.

The object of the invention to provide a vehicle lamp and a vehicle lamp unit capable of enhancing a visibility of a forward road surface of a vehicle in the rain without applying emitting glare to the driver of the oncoming vehicle.

The above object is accomplished by a unique structure for a vehicle lamp that irradiates a light beam forward that has a light distribution pattern suitable for irradiating the lane marks.

More specifically, the present invention provides a vehicle lamp for irradiating a light beam forward with a predetermined light distribution pattern; and in the present invention, the luminous intensity distribution in lateral direction in a first angle position which is a downward direction at a predetermined angle with respect to a longitudinal axis passing through a center of the lamp of the light distribution pattern is set to be a luminous intensity distribution that has a pair of left and right peaks relative to the longitudinal axis.

In an actual vehicle, the "vehicle lamp" is used with a normal headlamp (i.e., headlamp switchable between a low beam and a high beam). The vehicle lamp may be turned ON while turning the headlamp ON. Only the vehicle lamp may be turned ON instead.

The specific lamp structure for the "luminous intensity distribution having a pair of left and right peaks of an axis in the longitudinal direction" is not particularly limited. For example, it is possible to employ a structure in which the light from a light source is controlled to permeate and is deflected by a reflector. In addition, a structure in which the light incident from the light source to the reflector is controlled to be partially shaded by a shade can be employed; and a structure that is a combination of the above-described structures can be also employed as well.

As seen from the above, the vehicle lamp of the present invention irradiates a light beam forward with a predetermined light distribution pattern, and the luminous intensity distribution in lateral direction in a first angle position which is downward direction at a predetermined angle with respect to a longitudinal axis passing through the center of the lamp of the light distribution pattern is set so as to be a luminous intensity distribution that has a pair of (left and right) peaks relative to the longitudinal axis. Accordingly, it is possible to increase the irradiation light amount to the left and right regions while restricting the irradiation light amount to a front region of the light of the road surface ahead of the vehicle corresponding to the first angle position.

Therefore, when the road surface is wet in the rain, for instance, it is possible in the present invention to prevent emission of the great glare to a driver of an oncoming vehicle by regular reflection on the front region of the lamp of the road surface ahead of the vehicle, and it is also possible to brightly irradiate the lane marks existing on the left and right regions.

According to the present invention, the visibility with respect to the forward road surface of a vehicle driving in the rain is enhanced without emitting the great glare to the driver of the oncoming vehicle.

The downward angle with respect to the longitudinal axis of the "first angle position" is not limited. Assuming that it is set to 4° and the height of the lamp unit from the ground to its center is 0.7 m, such a position corresponds to the point on the road surface ahead of the vehicle about 10 m forward from the headlamp. When the light beam irradiated to the point in the close forward region of about 10 m normally reflects in the front region of the lamp, the light beam emits great glare to the driver of the oncoming vehicle. The light beam, however, is suitable for irradiating the lane marks on the left and right side of the region. Therefore, it is especially effective to set the first angle position to the point inclined downward at 4° for providing the effect.

In the above-described structure, furthermore, the luminous intensity distribution of the light distribution pattern in lateral direction in a second angle position which is downward direction at a predetermined angle with respect to the first angle position is set to a luminous intensity distribution that has a pair of left and right peaks relative to the longitudinal axis, and the pair of peaks of the second angle position are located at position away from the longitudinal axis with respect to the pair of peaks in the first angle position. This arrangement provides the following effects.

Suppose that the road surface ahead of the vehicle is viewed from the vehicle lamp, the lane marks appear to extend radially from the lamp's longitudinal axis to the lower left and the lower right directions. Therefore, if the peaks of the second angle position are located away from the longitudinal axis with respect to those peaks in the first angle position, the light distribution pattern extending radially from the longitudinal axis to the lower left and the lower right can be obtained. This makes it possible to irradiate the road surface ahead of the vehicle brightly along the lane marks.

If, for example, the second angle position is set to be inclined downward at 8° and the height from the ground to the center of the lamp is 0.7 m, then such a position corresponds the point on the road surface ahead of the vehicle about 5 m from the lamp. As a result, the lane marks are irradiated up to the point in the close region of about 5 m forward from the lamp unit.

Furthermore, by way of setting the luminous intensity of each of the peaks in the first angle position higher than that of the peaks in the second angle position, it is possible to irradiate the lane marks along their longitudinal direction with relatively uniform illumination.

Recently, in lamp units for irradiating the point on the road ahead of a vehicle with a light beam a line segment light source that extends along the longitudinal axis has been increasingly used. In these lamps, if the lamp unit is viewed from behind, the light distribution pattern irradiated forward with a light beam from a region located upper right and lower left positions with respect to the center of the lamp unit is formed in accordance with an image that extends diagonally from the upper right to the lower left. The light distribution pattern irradiated forward with a light beam from the region located upper left position and lower right position with respect to the lamp unit is formed in accordance with the image that extends diagonally from the upper left position to the lower right position.

Accordingly, by way of setting so that the vehicle lamp irradiates a light beam leftward, when viewed from behind the lamp, from regions located at upper right position and/or lower left position with respect to the center of the lamp and also by way of setting so that the lamp irradiates a light beam rightward, when viewed from behind the lamp, from regions located at upper left position and/or lower right position with respect to the center of the lamp, then it is possible to efficiently irradiate the lane marks on left and right sides of the road ahead of the vehicle.

In the above, the description is made for a single vehicle lamp that irradiates the lane marks on both left and right sides of the road. However, the headlamps are generally mounted, respectively, on the left and right front sides of a four-wheeled vehicle. It is thus possible to design so that the respective lamp units independently irradiates the lane marks by way of an idea that the left and right pair of lamp comprise a vehicle lamp unit.

More specifically, the luminous intensity distribution of the light distribution pattern formed by the left lamp in lateral direction in the first angle position which is inclined downward at a predetermined angle with respect to the longitudinal axis passing through the center of the lamp is set to a luminous intensity distribution that has a peak on the left side with respect to the longitudinal axis of the lamp; and also the luminous intensity distribution of the light distribution pattern formed by the right lamp in lateral direction in the first angle position is set to a luminous intensity distribution that has a peak on the right side with respect to the longitudinal axis passing through the center of the lamp. This arrangement allows the left lamp to irradiate the left lane marks with the light beam, and the right lamp irradiates the right lane marks with the light beam. Therefore, it is possible to irradiate the left and right lane marks without deviating the light beam emitted forward from the respective lamp units with respect to the lateral direction. The lane marks, thus, can be irradiated further efficiently and precisely.

In this case also, it is preferable that the first angle position be set to be downwardly inclined at 4° with respect to the longitudinal axis so that the lane marks can be irradiated more brightly without emitting great glare to the driver of the oncoming vehicle.

Also when such a vehicle lamp as described above is employed, the following arrangement can still be employed. The luminous intensity distribution of the light distribution pattern formed by the left lamp in lateral direction in the second angle position which is downwardly inclined at a predetermined angle with respect to the first angle position is set to a luminous intensity distribution having a peak on the left side of the longitudinal axis passing through the center of the left lamp, and the peak is positioned to the left of the peak in the first angle position; and in addition the luminous intensity distribution of the light distribution pattern formed by the right lamp in lateral direction in the second angle position is set to a luminous intensity distribution having a peak on the right side of the longitudinal axis passing through the center of the right lamp, and the peak is positioned to the right of the peak in the first angle position. This structure brightly irradiates the road surface ahead of the vehicle along the lane marks.

In this case also, by way of setting the second angle position to be inclined downward at 8° with respect to the longitudinal axis, the lane marks can be reliably irradiated to the region as close as possible.

Furthermore, if the luminous intensity of each of the peaks in the first angle position is set higher than that of those peaks in the second angle position, the lane marks can be irradiated with relatively uniform illumination along the longitudinal direction.

Further, by way of setting so that the left lamp irradiates a light beam leftward, when viewed from behind the left lamp, from regions located at upper right position and/or lower left position with respect to the center of the left lamp; and by way of setting so that the right lamp irradiates a light beam rightward, when viewed from behind the right lamp, from regions located at upper left position and/or lower right position with respect to the center of the right lamp, it is possible to efficiently irradiate the road surface ahead of the vehicle along the lane marks.

BRIEF DESCRIPTION OF THE SEVERAL VIEWS OF THE DRAWINGS

FIGS. 8A and 8B show the luminous intensity distribution in the lateral direction of the lane marks irradiation light distribution pattern formed by the vehicle lamp unit of the present invention.

DETAILED DESCRIPTION OF THE INVENTION

Embodiments of the present invention will be described below with reference to the accompanying drawings.

The first embodiment of the invention will be explained first.

Figure 1:
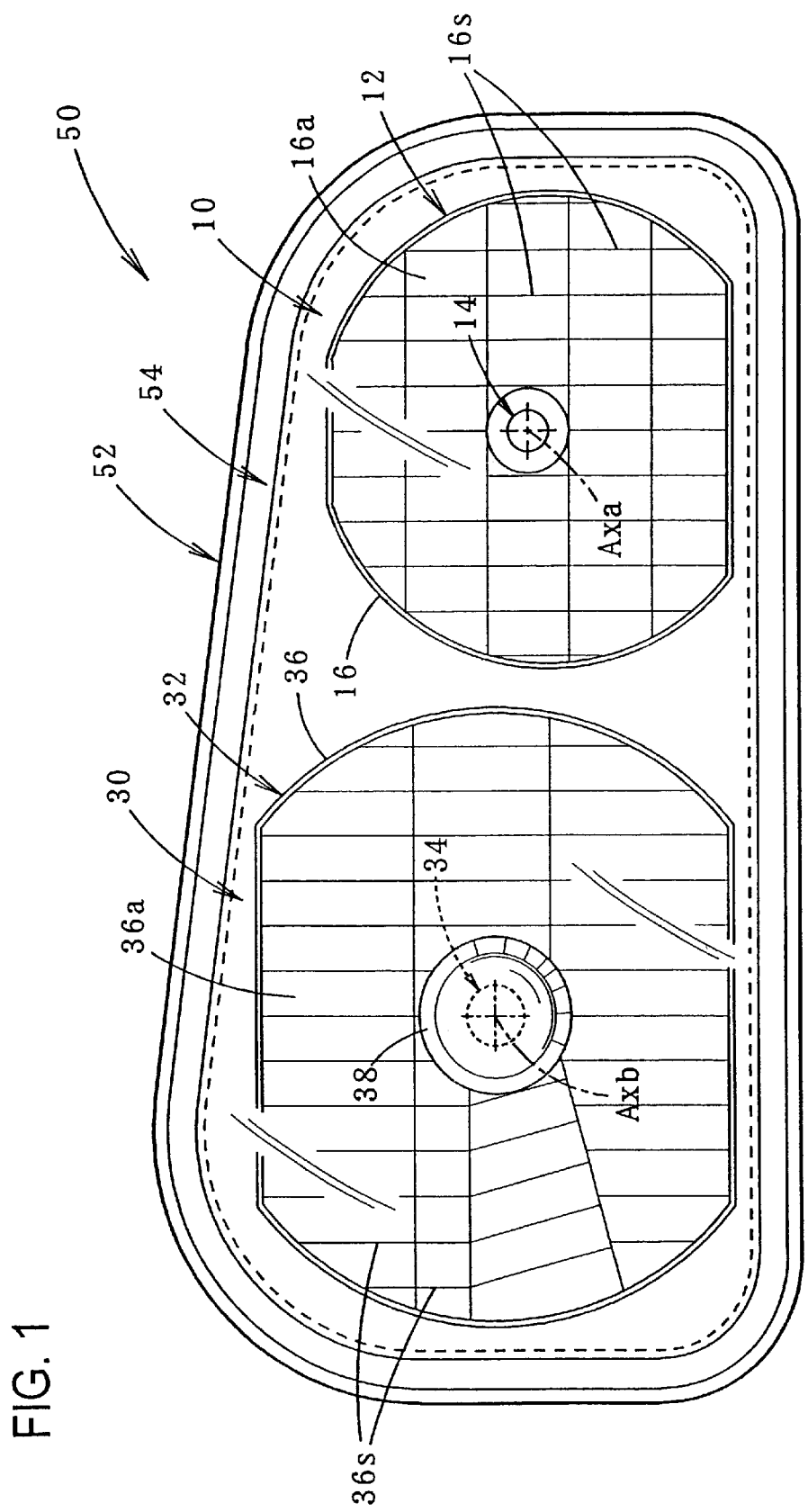
FIG. 1 is a front view of a combination headlamp in which a vehicle lamp (lane mark irradiation light) according to the first embodiment of the present invention is incorporated.

FIG. 1 is a front view of a combination headlamp 50 in which a vehicle lamp 10 according to the first embodiment of the present invention is incorporated.

The vehicle lamp 10 of this embodiment is a lane mark irradiation lamp as will be described later and defines the combination headlamp 50 together with a headlamp 30.

The combination headlamp 50 is a lamp provided on a right front end of a vehicle, and it includes a plain transparent cover 54 mounted to a front end opening of a lamp body 52. In the lamp chamber of the combination headlamp 50, a reflector unit 12 for the lane mark irradiation lamp 10 and a reflector unit 32 for the headlamp 30 are arranged side-by-side.

The reflector unit 32 for the headlamp 30 comprises a light source bulb 34, a reflector 36 for supporting the light source bulb 34, and a shade 38 for shielding the direct light emitted forward from the light source bulb 34.

The light source bulb 34 is an H4-type halogen bulb that has a low beam filament and a high beam filament both extending along the longitudinal axis Axb. The reflector 36 includes a reflection surface 36a composed of a plurality of reflection elements 36s. The reflection surface 36a reflects the light from the light source bulb 34 so as to be diffusion deflected forward so that the light beam irradiation is performed forward of the vehicle with a predetermined light distribution pattern.

Figure 2:
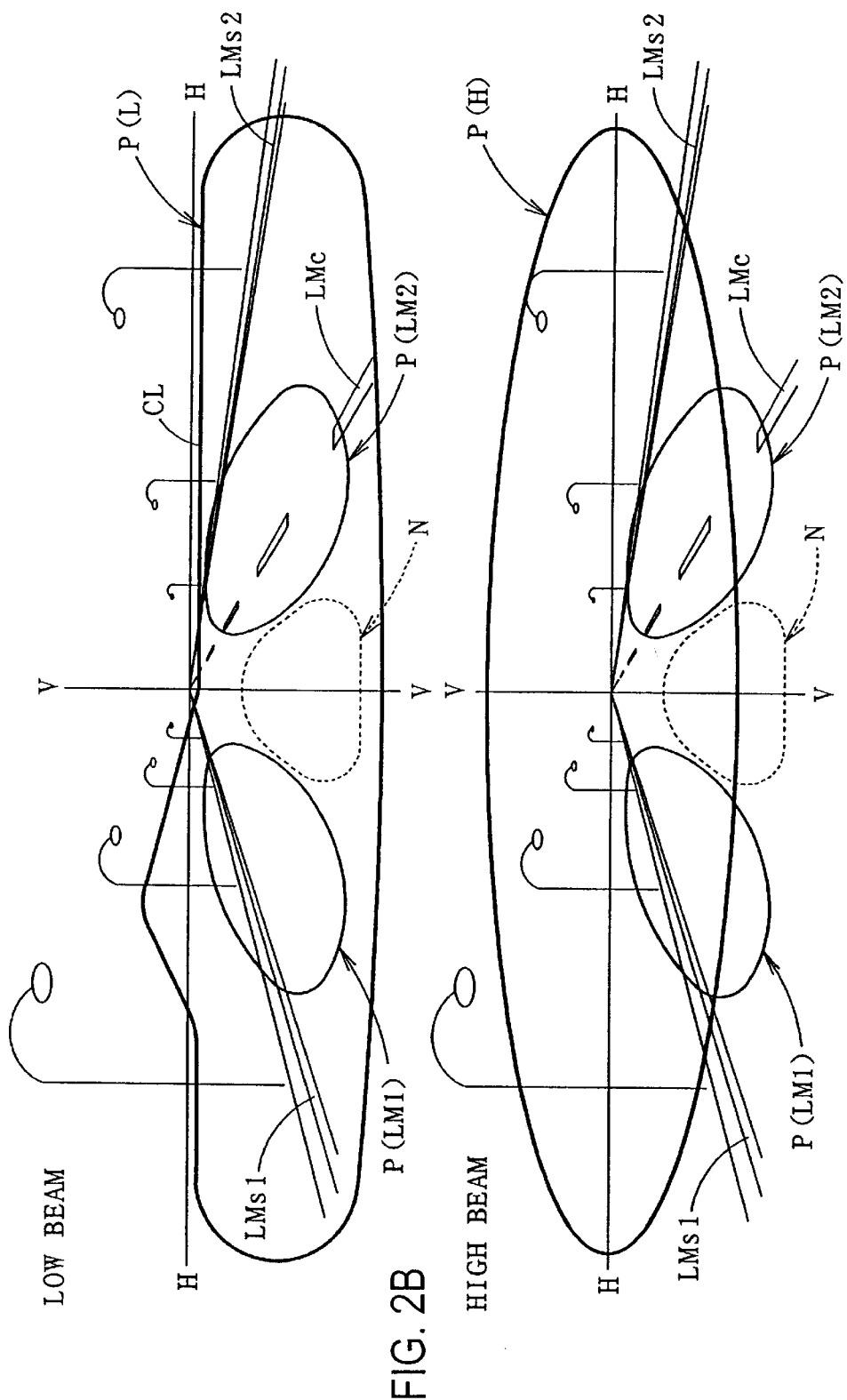
FIGS. 2A and 2B illustrates the road surface ahead of a vehicle together with the light distribution pattern of the present invention as viewed from the position of a right-side combination headlamp.
Figure 3:
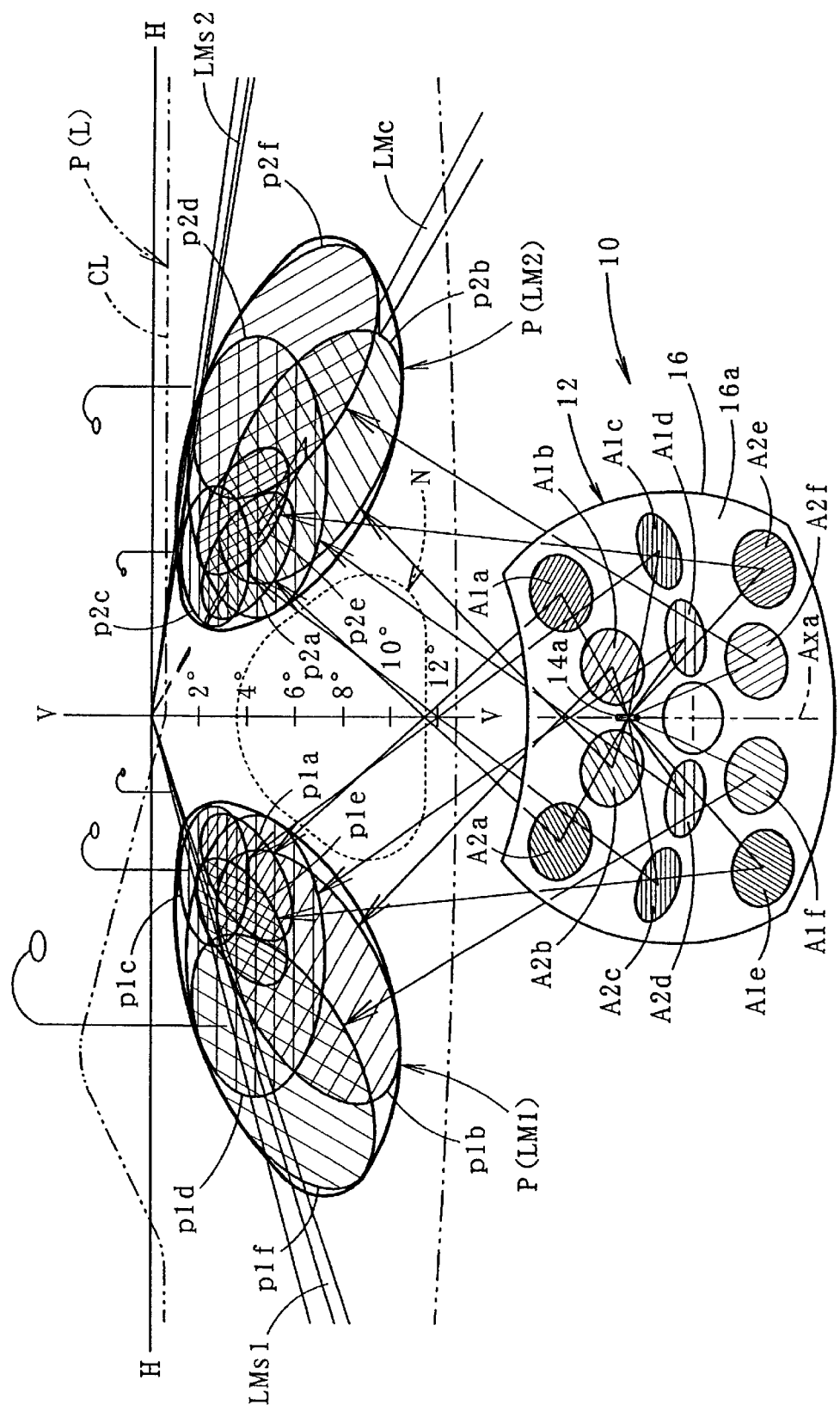
FIG. 3 illustrates the lane mark irradiation light distribution pattern formed by the lane mark irradiation light of the present invention as viewed from diagonally upper rear direction of a reflector unit.

As seen from FIG. 2A, when turning the low beam filament of the light source bulb 34 ON, light beam is emitted with a low beam light distribution pattern P(L) having a cut off line (light/dark boundary line) CL (see FIG. 3). When switching to the high beam filament, light beam is emitted with a high beam light distribution pattern P(H) shown in FIG. 2B.

On the other hand, the reflector unit 12 for the lane mark irradiation lamp 10 is provided with a light source bulb 14 and a reflector 16 for supporting the light source bulb 14.

The light source bulb 14 is an H7-type halogen bulb having a single filament extending along the longitudinal axis Axa passing the center of the lamp unit. The reflector 16 includes a reflection surface 16a composed of a plurality of reflection elements 16s. The reflection surface 16a reflects the light from the light source bulb 14 so as to be diffusion deflected forward such that the beam irradiation is performed forward of the vehicle with a pair of left and right lane mark irradiation light distribution patterns P(LM1) and P(LM2) as shown in FIGS. 2A and 2B.

The combination headlamp 50 is structured so that the headlamp 30 and the lane mark irradiation lamp 10 can be independently turned ON/OFF.

In other words, as described above, the headlamp 30 allows switching between the low beam and high beam. Therefore, when simultaneously turning the lane mark irradiation lamp 10 and the headlamp 30 ON, it is possible to provide a light distribution pattern formed by superimposing the pair of left and right lane mark irradiation light distribution patterns P(LM1) and P(LM2) to the low beam light distribution pattern P(L) or the high beam light distribution pattern P(H) as shown in FIGS. 2A and 2B. It is also possible to turn only the lane mark lamp 10 ON so as to form both the lane mark illumination distribution patterns P(LM1) and P(LM2) only.

FIGS. 2A and 2B show the road surfaces ahead of the vehicle, when running on a straight paved road of a single lane on one side (two lanes in total). The road is seen from the combination headlamp 50 mounted on the right side of the vehicle front (specifically from the center of the lamp unit of the right-side lane mark irradiation lamp) and the light distribution patterns generated by the combination headlamp 50 are set thereon.

In FIGS. 2A and 2B, the point H-V (an intersection of the lines H—H and V—V) is a vanishing point of the perspective view, and such a point coincides with forward extension points of the longitudinal axis Axa that passes through the lamp center of the lane mark irradiation lamp 10 and the longitudinal axis Axb that passes through the lamp center of the headlamp 30.

As seen from FIGS. 2A and 2B, on the road surface ahead of the vehicle, a center line LMc located at the center and a pair of side lines LMs1 and LMs2 located at opposite sides of the center line LMc are painted as lane marks for defining the lanes. The center line LMc is formed by an intermittent lane marks, and the side lines LMs1 and LMs2 are formed by continuous (solid) lane marks.

When the vehicle is running on the dry road surface, that is, running in the night on a fine day or running through a tunnel, turning the headlamp 30 ON is sufficient for driving. In this case, the light beam is switched depending on the running state (including the presence or absence of the oncoming vehicle), and the light beam may be emitted from the low beam light distribution pattern P(L) or the high beam light distribution pattern P(H).

On the other hand, when the vehicle is running on the wet road surface, that is, running in the rainy night, most of forward irradiation light from the headlamp 30 normally reflects on the road surface, reducing the reflective intensity light to the driver of the running vehicle. As a result, visibility with respect to the road surface ahead of the vehicle is deteriorated, which may hinder the driving operation. However, the visibility with respect to the pair of lane marks (i.e., the left side line LMs1 and the center line LMc) for partitioning the vehicle lanes can be kept in a relatively good condition even on the wet road surface. The visibility with respect to the lane marks LMs1 and LMc can be enhanced by increasing the amount of light irradiated forward from the headlamp 30, facilitating the driving operation. In such a case, however, the amount of light normally reflecting on the road surface ahead of the vehicle is increased, resulting in great glare emission to the driver of the oncoming vehicle. The driver, thus, is interfered with the driving operation.

In this case, the normal reflection light that is the glare emitted to the driver of the oncoming vehicle is the light normally reflected in a front close distance region N around the line V—V on the road surface ahead of the vehicle as shown by dashed lines of FIGS. 2A and 2B.

A large amount of light normally reflecting in the front close distance region N reaches the eyes of the driver of the oncoming vehicle, and the normal reflection direction is close to the direction of the driver's view (the driver sees forward during driving). As a result, great glare is emitted to the driver of the oncoming vehicle. Meanwhile, the light normally reflecting in the region deviating to the left and right sides of the front close distance region N fails to reach the driver's eyes, or the normal reflection direction of such a light is deviated from the direction of the driver's view. Thus, the light normally reflecting in the region deviating to the left and right sides of the front close distance region N hardly emits great glare to the driver of the oncoming vehicle.

In view of the above, in this embodiment, the lane mark irradiation lamp serves to form a pair of lane mark irradiation light distribution patterns P(LM1) and P(LM2) in the region deviated rightward and leftward from the front close distance region N so as to enhance the visibility with respect to the road surface ahead of the vehicle without emitting great glare to the driver of the oncoming vehicle.

The lane marks LMs1 and LMc for partitioning the lanes on the road surface ahead of the running vehicle radially extend from the point H-V toward the lower left and the lower right, respectively. As a result, the lane mark irradiation light distribution patterns P(LM1) and P(LM2) are shaped so as to extend from the point H-V toward lower left and lower right along the left side line LMs1 and the center line LMc, respectively.

FIG. 3 illustrates how the lane mark irradiation lamp 10 forms the lane mark irradiation light distribution patterns P(LM1) and P(LM2). It shows, together with the road surface ahead of the vehicle, the reflector unit 12 of the lane mark irradiation lamp 10 viewed from a diagonally upper rear direction of the reflector unit 12.

As shown in FIG. 3, upper right regions A1$a$ and A1$b$, right regions A1$c$ and A1$d$ and lower left regions A1$e$ and A1$f$ with respect to the lamp center on the reflection surface 16$a$ of the reflector 16 of the reflector unit 12 appropriately diffusion deflection reflect the light from the light source 14$a$ (filament of the light source bulb 14), emit the reflection light leftward to the longitudinal axis Axa, and form light distribution pattern elements p1$a$ to p1$f$, respectively. The left lane mark irradiation light distribution pattern P(LM1) is formed as the synthetic pattern of those elements p1$a$ to p1$f$.

More specifically, the light distribution pattern elements p1$a$ and p1$e$ are relatively small light distribution pattern elements extending in the lower left direction and define an upper right portion of the lane mark irradiation light distribution pattern P(LM1). The light distribution pattern elements p1$b$ and p1$f$ are relatively large light distribution pattern elements extending in the lower left direction and define a lower left portion of the lane mark irradiation light distribution pattern P(LM1). Further, the light distribution pattern elements p1$c$ and p1$d$ are light distribution pattern elements extending horizontally. The light distribution pattern element p1$c$ is relatively small and defines an upper right end of the lane mark irradiation light distribution pattern P(LM1). The light distribution pattern element p1$d$ is relatively large and defines a slightly upper right portion from the center of the lane mark irradiation light distribution pattern P(LM1).

Figure 4:
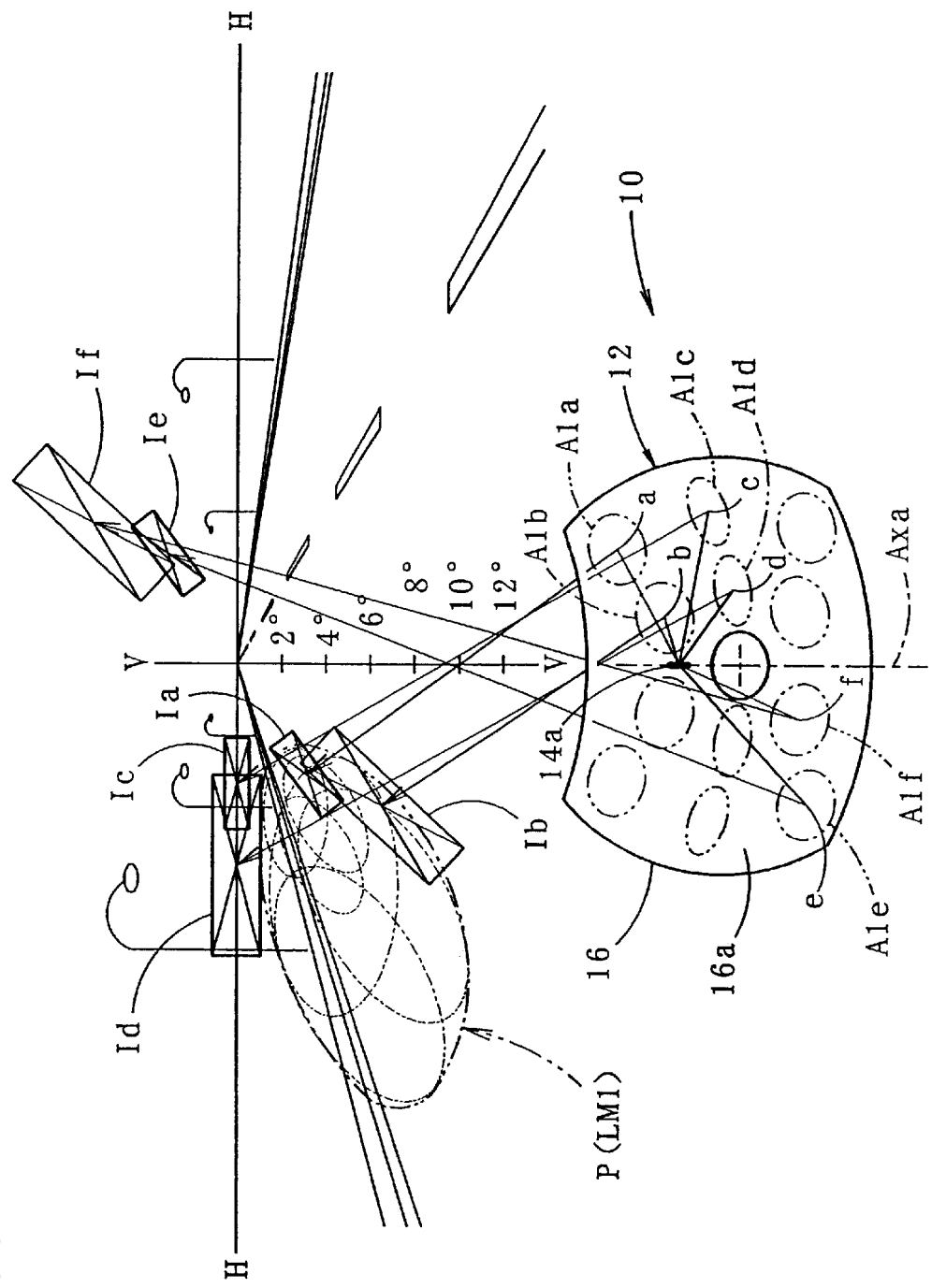
FIG. 4 is an explanatory illustration of the formation method of the lane mark irradiation light distribution pattern, showing the image of a light source formed on an imaginary screen in front of the light.

FIG. 4 shows an image of the light source 14$a$ formed on an imaginary screen in front of the lamp by the reflection light from various points of the reflection surface 16$a$ when the reflection surface 16$a$ is assumed to be a paraboloid of revolution that rotates around a center axis of the longitudinal direction axis Axa and that has focus in the vicinity of a position behind the light source 14$a$.

As seen from FIG. 4, the light source 14$a$ is a line segment light source which extends along the longitudinal axis Axa and is disposed in front of the focus. Therefore, the images Ia and Ib of the light source 14$a$ formed by the reflection light from the center points a and b of the upper right regions A1$a$ and A1$b$ of the reflection surface 16$a$ appear as reversed images that extend in a lower left direction in the lower left region of the H-V point. In this state, the image Ia formed by the reflection light from the center point a of the upper right region A1$a$ away from the longitudinal axis Axa on the reflection surface 16$a$ is smaller than the image Ib formed by the reflection light from the center point b of the upper right region A1$b$ near the longitudinal axis Axa and is formed at a position closer to the H-V point.

Likewise, the images Ic and Id of the light source 14$a$ formed by the reflection light from the center points c and d of the right regions A1$c$ and A1$d$ of the reflection surface 16$a$ appear as reversed images that extend leftward in the left region of the H-V point. In this state, the image Ic formed by the reflection light from the center point c of the right region A1$c$ away from the longitudinal axis Axa on the reflection surface 16$a$ is smaller than the image Id formed by the reflection light from the center point d of the right region A1$d$ near the longitudinal axis Axa and is formed at a position closer to the H-V point.

Further, the images Ie and If of the light source 14$a$ formed by the reflection light from the center points e and f of the lower left regions A1$e$ and A1$f$ of the reflection surface 16$a$ appear as reversed images that extend in the upper right direction in the upper right region of the H-V point. In this state, the image Ie formed by the reflection light from the center point e of the lower left region A1$e$ away from the longitudinal axis Axa on the reflection surface 16$a$ is smaller than the image If formed by the reflection light from the center point f of the lower left region A1$f$ near the longitudinal axis Axa and is formed at a position closer to the H-V point.

These images Ia to If are deflected and dispersed by the reflection elements 16$s$ (see FIG. 1) formed in the respective regions A1$a$ to A1$f$, thereby forming the light distribution pattern elements p1$a$ to p1$f$ as show in FIG. 3. Thus, the light distribution pattern elements p1$a$ to p1$f$ can be easily formed by utilizing the images Ia to If which are similar to the respective pattern elements in shape without exerting load to the reflection elements 16$s$. In this state, the light distribution pattern elements p1$a$, p1$c$ and p1$e$ formed at positions closer to the H-V point based on the small images Ia, Ic and Ie are disposed at positions close to the H-V point in the lane mark irradiation light distribution pattern P(LM1). With this arrangement, the luminous intensity of the portion in the lane mark irradiation light distribution pattern P(LM1) closer to the H-V point becomes relatively higher than that of the portions away from the H-V point.

In FIG. 3, furthermore, the upper left regions A2$a$ and A2$b$, the left regions A2$c$ and A2$d$ and lower right regions A2$e$ and A2$f$ of the lamp center on the reflection surface 16$a$ of the reflector 16 of the reflector unit 12 diffusion deflection reflect the light from the light source 14$a$. The reflection light is emitted rightward with respect to the longitudinal axis Axa, and the light distribution pattern elements p2$a$ to p2$f$ are formed. The right lane mark irradiation light distribution pattern P(LM2) is formed by synthesizing the light distribution pattern elements p2a to p2f. The lane mark irradiation light distribution pattern P(LM2) is disposed laterally symmetric with respect to the lane mark irradiation light distribution pattern P(LM1) about the longitudinal axis Axa.

When the light distribution pattern elements p2a to p2f are formed, the diffusion deflection functions given to the reflection elements 16s (see FIG. 1) formed in the regions A2a to A2f are identical to those in the case where the light distribution pattern elements p1a to p1f constituting the left lane mark irradiation light distribution pattern P(LM1).

As seen from FIG. 3, both the lane mark irradiation light distribution patterns P(LM1) and P(LM2) extend from positions in a lower left direction and in a lower right direction from the H-V point at an angle of about 120° and from positions inclined downward from the position of about 2° to the position of about 10° (see V—V line) with respect to H—H line.

Figure 5:
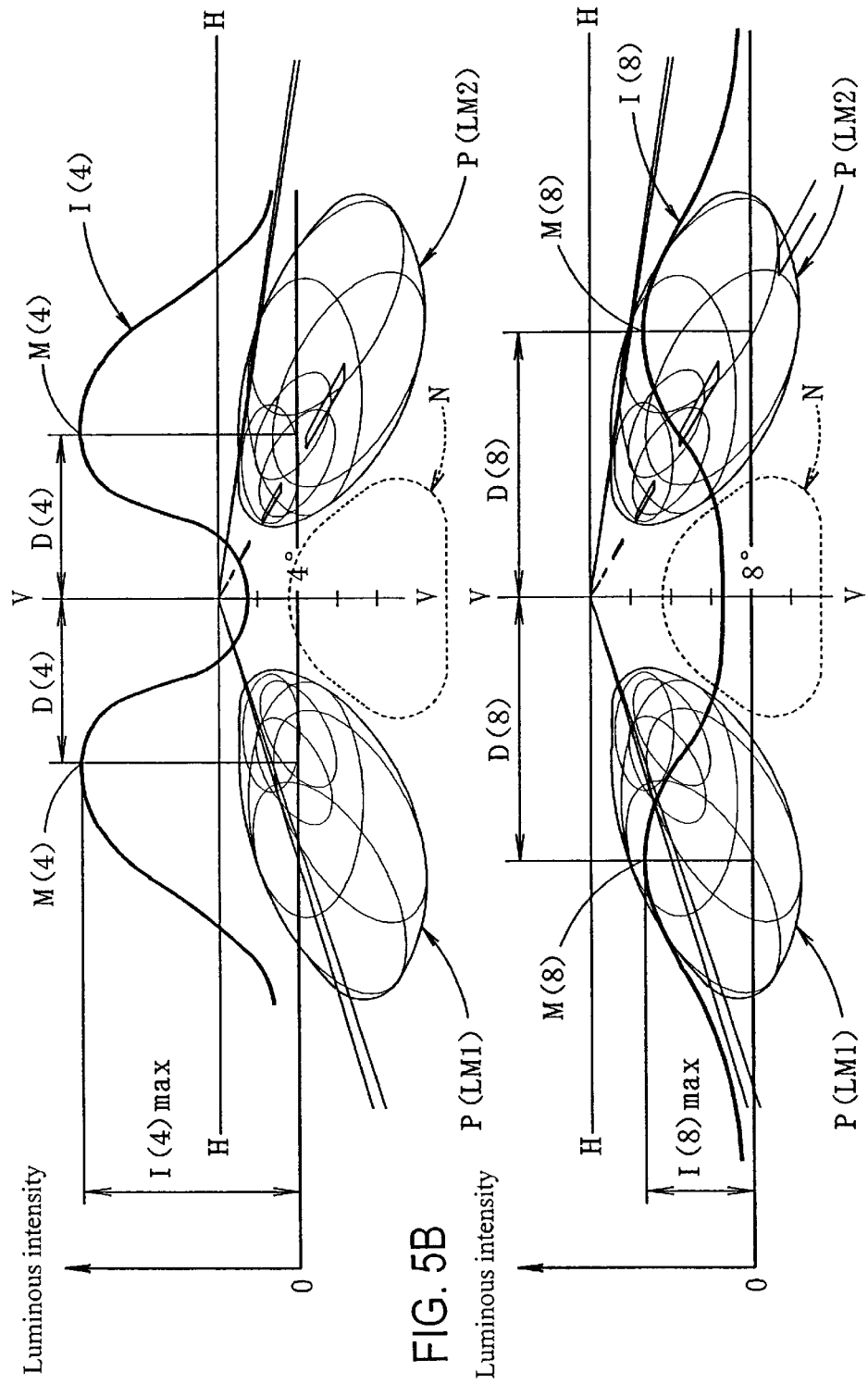
FIGS. 5A and 5B illustrate the luminous intensity distribution in the lateral direction of the lane mark irradiation light distribution pattern of the present invention.

FIGS. 5A and 5B show luminous intensity distributions in the lateral direction of the pair of left and right lane mark irradiation light distribution patterns P(LM1) and P(LM2) irradiated by the lane mark irradiation lamp 10. In particular, FIG. 5A shows the luminous intensity distribution I(4) at a position downwardly inclined at 4° from the H-V point, and FIG. 5B shows the luminous intensity distribution I(8) at a position downwardly inclined at 8° from the H-V point. In these luminous intensity distributions, the vertical axis indicates the luminous intensity, and the lateral axis indicates the positions of the luminous intensity distributions along the H—H line.

As seen from FIGS. 5A and 5B, in the state in which the pair of left and right lane mark irradiation light distribution patterns P(LM1) and P(LM2) are synthesized, the leftward and rightward luminous intensity distributions I(4) and I(8) at positions inclined downward at 4° and 8° are set into the luminous intensity distributions having pair of peaks M(4) and M(8) at left and right opposite sides of the V—V line (longitudinal axis Axa). The front close distance region N on the road surface ahead of the vehicle is located where the luminous intensity between the pair of peaks M(4) is low in the case of downwardly inclined position at 4°; and the front close distance region N is located where the luminous intensity between the pair of peaks M(8) is low in the case of downwardly inclined position at 8°.

Furthermore, the positions of both peaks M(4) in the luminous intensity distributions I(4) at the position downwardly inclined at 4° is set to a position closer to the V—V line than both peaks M(8) in the luminous intensity distributions I(8) at the position downwardly inclined at 8°. In other words, the distance D(4) from the V—V line to both peaks M(4) is set to be smaller than the distance D(8) from the V—V line to both.peaks M(8) as expressed by D(4)<D (8).

The luminous intensity distributions I(4)max of the peak M(4) at the position downwardly inclined at 4° is set higher than the luminous intensity distributions I(8)max of the peak M(8) at the position downwardly inclined at 8°.

If the height of the lamp center of the lane mark irradiation lamp 10 is 0.7 m on the road surface ahead of the vehicle, then the downward angle 2°, 4°, 8° and 10° respectively correspond to positions about 20 m, 10 m, 5 m and 4 m forward of the lamp. Therefore, if the lane mark irradiation lamp 10 is turned ON to form the pair of left and right lane mark irradiation light distribution patterns P(LM1) and P(LM2), it is possible to irradiate the opposite side lane marks LMs1 and LMc in a range from about 4 m(extremely close distance) to about 20 m (medium distance). Further, in this state, since the lane mark irradiation light distribution patterns P(LM1) and P(LM2) are set so that the luminous intensity at portion closer to H-V point becomes relatively higher than that of the portion away from the H-V point, it is possible to irradiate the lane marks LMs1 and LMc in the range from an extremely close distance region to a medium distance region with relatively uniform illumination.

Figure 6:
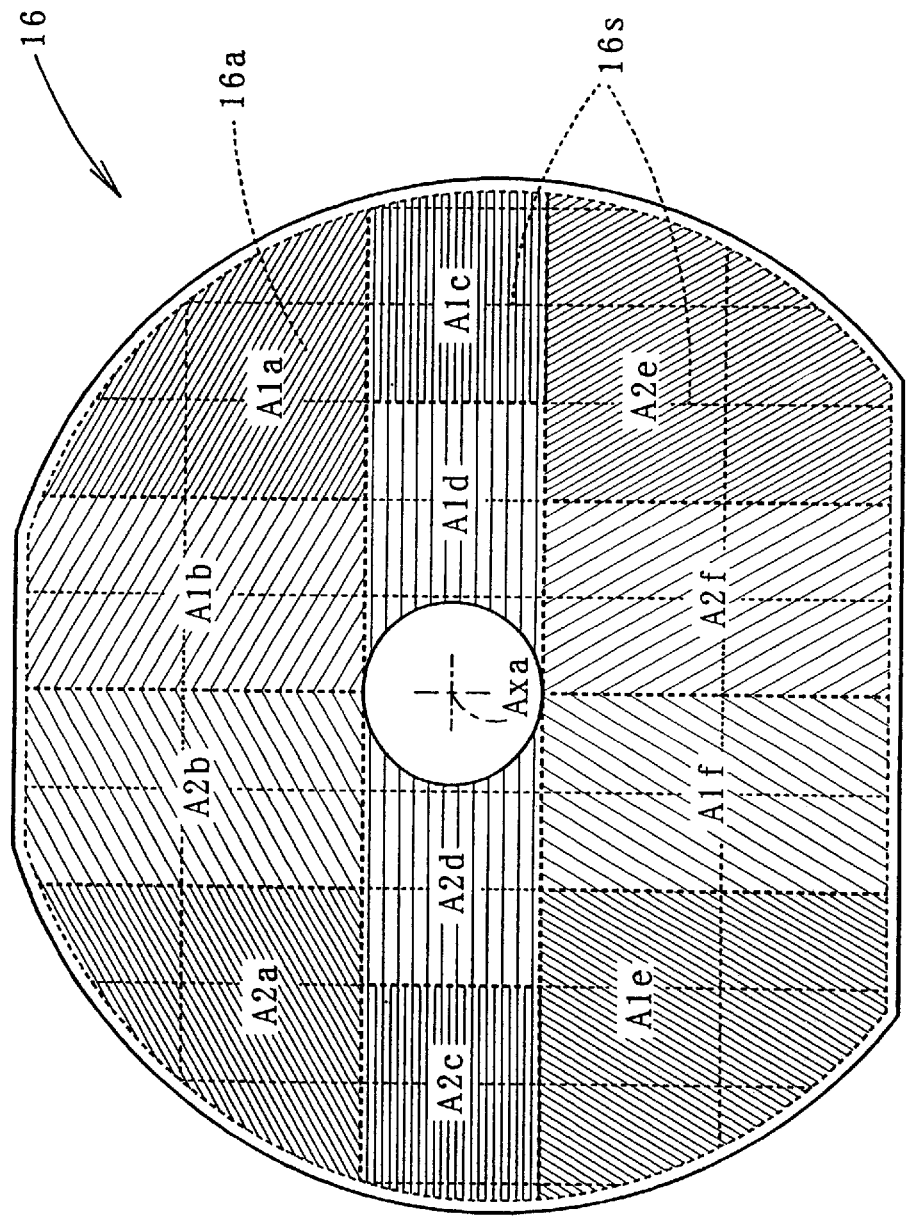
FIG. 6 is a rear view of a reflector of the lane mark irradiation light used in the present invention.

In FIG. 3, the regions A1a to A1f and A2a to A2f are shown in oval shape. In an actual reflector 16, the specific corresponding relation between the reflection elements 16s that form the reflection surface 16a and the regions A1a to A1f and A2a to A2f is as shown in FIG. 6 that illustrates the reflector 16 viewed from behind.

As described above in detail, the lane mark irradiation lamp 10 according to this embodiment of the present invention increases the irradiation light amount to the left and right regions while restraining the irradiation light amount to the front close distance region N on the road surface ahead of the vehicle. Therefore, when the road surface ahead of the vehicle is wet, the lamp brightly illuminates the lane marks LMs1 and LMc on the left and right regions of the road while preventing great glare from being emitted to the driver of the oncoming vehicle by the normal reflection light in the front close distance region N.

In other words, with the lamp according to the above embodiment, it is possible to enhance the visibility with respect to the road surface ahead of the vehicle during driving, for instance, in the rain.

Further, in the lane mark irradiation lamp 10 of the above embodiment, light beams from the upper right regions A1a and A1b and the lower left regions A1e and A1f on the reflection surface 16a of the reflector 16, when viewed from behind of the lamp, are emitted leftward; and light beams from the upper left regions A2a and A2b and the lower right regions A2e and A2f, when viewed from behind of the lamp, are emitted rightward. Therefore, the lane mark irradiation light distribution patterns P(LM1) and P(LM2) are easily formed along the left and right lane marks LMs1 and LMc.

Further, in the above embodiment, light beams from the right regions A1c and A1d and the left regions A2c and A2d on the reflection surface 16a are emitted to the portions of the lane mark irradiation light distribution patterns P(LM1) and P(LM2) closer to the H-V point. Therefore, it is possible to set the lane mark irradiation light distribution patterns P(LM1) and P(LM2) such that the luminous intensity of the portion closer to the H-V point is higher than that of the portion away from the H-V point.

In the above embodiment, the reflector 16 is a so-called step reflector that has the reflection surface 16a comprising a plurality of reflection elements 16s. It is, however, also possible to employ a reflector that has a reflection surface formed of a free curved surface which is not divided into plural reflection elements 16s. In this case, the same light distribution patterns as those of the shown embodiment are formed by reflection light from the reflection regions that correspond to the regions A1a to A1f and A2a to A2f on the reflection surface.

The lane mark irradiation lamp 10 is incorporated in the right combination headlamp 50 in the above embodiment. For the lane mark irradiation lamp 10 incorporated in the left combination headlamp, it is indeed possible to obtain the same lane mark irradiation light distribution pattern as that of the described embodiment by employing the same structure. In this case, the view of the road surface ahead of the vehicle as viewed from the left combination headlamp is deviated in the lateral direction by a distance between the left and right combination headlamps. Like the above lane mark irradiation lamp 10, it is possible to efficiently irradiate the road surface ahead of the vehicle along the left and right opposite side lane marks LMs1 and LMc.

Next, the second embodiment of the present invention will be described.

Figure 7:
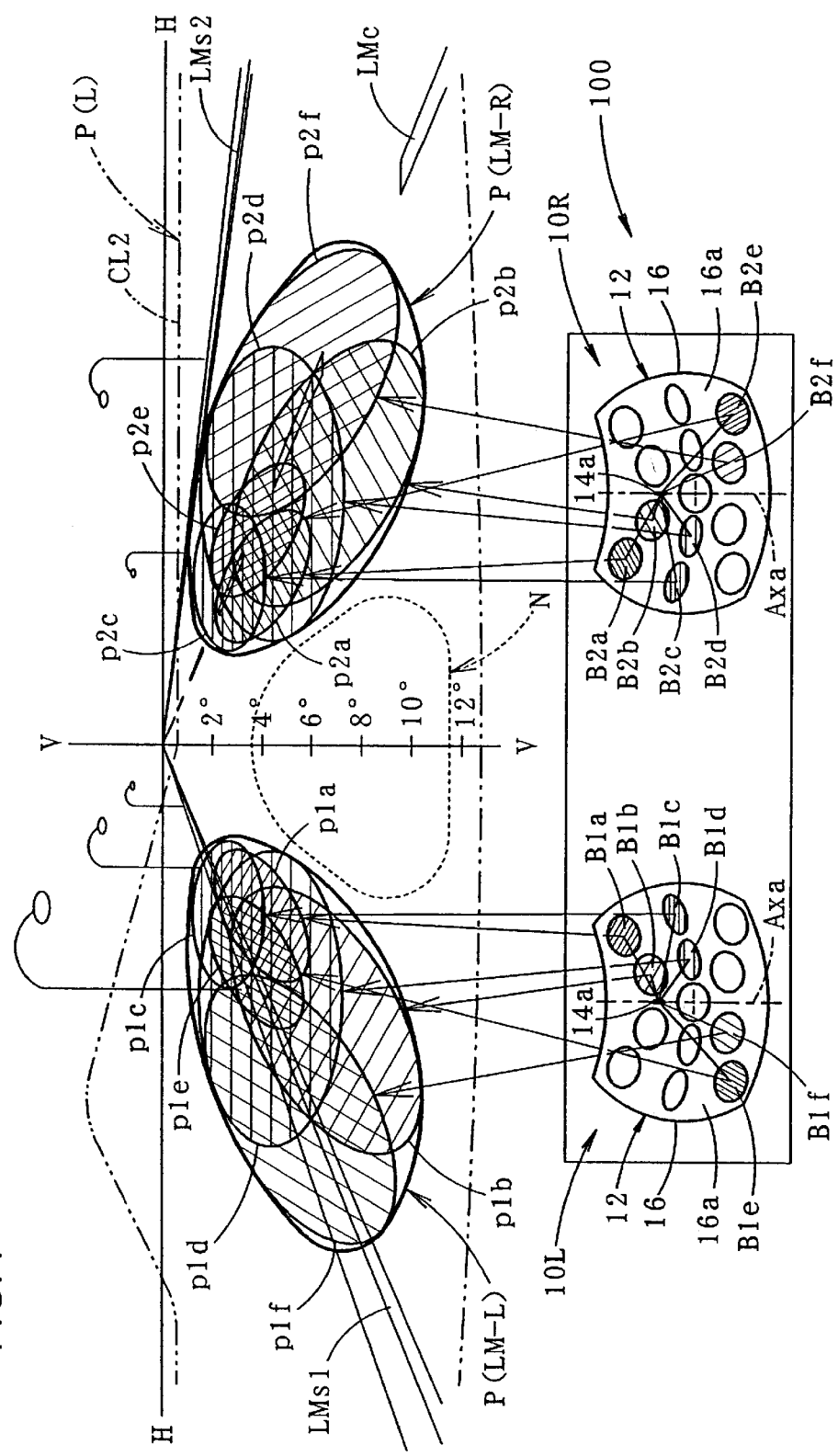
FIG. 7 illustrates the forward road surface of a vehicle as viewed from the center position in the lateral direction of the vehicle together with a lane mark irradiation light distribution pattern formed by the vehicle lamp according to the second embodiment of the present invention.

FIG. 7 shows the road surface ahead of a vehicle from the left and right center position of the vehicle together with the lane mark irradiation light distribution pattern formed by the vehicle lamp unit 100 of the second embodiment.

This vehicle lamp unit 100 is provided with a pair of lamps 10L and 10R mounted to the left and right front ends of the vehicle. The lamps 10L and 10R are lane mark irradiation lamps each having the same basic structure as that of the lane mark irradiation lamp 10 of the first embodiment and constitute the combination headlamp (not shown) together with the headlamps (not shown).

As seen from FIG. 7, the left lane mark irradiation lamp 10L irradiates the road surface ahead of the vehicle along the left lane mark LMs1, and the right lane mark irradiation lamp 10R irradiates the road surface ahead of the vehicle along the right lane mark LMc.

In the left lane mark irradiation lamp 10L, the upper right regions B1a and B1b, the right regions B1c and B1d and the lower left regions B1e and B1f of the lamp center on the reflection surface 16a of the reflector 16 of the reflector unit 12 appropriately diffusion deflection reflect the light from the light source 14a and irradiate leftward with respect to the longitudinal axis Axa, thus forming light distribution pattern elements p1a to p1f. These light distribution pattern elements p1a to p1f are synthesized so as to form the left lane mark irradiation light distribution pattern P(LM-L).

The lane mark irradiation light distribution pattern P(LM-L) is the same as the lane mark irradiation light distribution pattern P(LM1) of the first embodiment. Also, the light distribution pattern elements p1a to p1f that constitute the left lane mark irradiation light distribution pattern P(LM-L) and the manner of forming the distribution pattern P(LM-L) are the same as those of the first embodiment.

On the other hand, in the right lane mark irradiation lamp 10R, the upper left regions B2a and B2b, the left regions B2c and B2d and the lower right regions B2e and B2f of the lamp center on the reflection surface 26a of the reflector 26 of the reflector unit 12 diffusion deflection reflect the light from the light source 14a and irradiate rightward with respect to the longitudinal axis Axa, thus forming the light distribution pattern elements p2a to p2f. The light distribution pattern elements p2a to p2f are synthesized so as to form the right lane mark irradiation light distribution pattern P(LM-R).

The lane mark irradiation light distribution pattern P(LM-R) is the same as the lane mark irradiation light distribution pattern P(LM2) of the first embodiment. Also, the light distribution pattern elements p2a to p2f that constitute the right lane mark irradiation light distribution pattern P(LM-R) and the manner of forming the distribution pattern P(LM-R) are also the same as those of the first embodiment.

FIGS. 8A and 8B show the luminous intensity distributions in the lateral direction of the pair of left and right lane mark irradiation light distribution patterns P(LM-L) and P(LM-R) irradiated by the lane mark irradiation lamp 10. In particular, FIG. 8A shows the luminous intensity distributions I(L4) and I(R4) at a position downwardly inclined at 4° from the H-V point, and FIG. 8B shows the luminous intensity distribution I(L8) and I(R8) at a position downwardly inclined at 8° from the H-V point. In these luminous intensity distributions, the vertical axis indicates the luminous intensity, and the lateral axis indicates the positions of the luminous intensity distributions along the H—H line.

As seen from FIGS. 8A and 8B, in the left lane mark irradiation light distribution pattern P(LM-L), the luminous intensity distributions I(L4) and I(L8) in the lateral direction downwardly inclined at 4° and 8°, respectively, are set so as to be the luminous intensity distribution that has the peaks M(L4) and M(L8) on the left side of the V—V line. The position of the peak M(L4) in the luminous intensity distribution I(L4) at the position downwardly inclined at 4° is set so that it is closer to the V—V line than the peak M(L8) in the luminous intensity distribution I(L8) at the position downwardly inclined at 8°. In other words, the distance D(L4) from the V—V line to the peak M(L4) is smaller than the distance D(L8) from the V—V line to the peak M(L8) as expressed by D(L4)<D(L8). The luminous intensity distributions I(L4)max of the peaks M(L4) at the position downwardly inclined at 4° is set higher than the luminous intensity distribution I(L8)max of the peak M(L8).

On the other hand, in the right lane mark irradiation light distribution pattern P(LM-R), the luminous intensity distributions I(R4) and I(R8) in the lateral direction downwardly inclined at 4° and 8°, respectively, are set so as to be the luminous intensity distribution that has the peaks M(R4) and M(R8) on the right side of the V—V line. The position of the peak M(R4) in the luminous intensity distribution I(R4) at the position downwardly inclined at 4° is set so that it is closer to the V—V line than the peak M(R8) in the luminous intensity distribution I(R8) at the position downwardly inclined at 8°. In other words, the distance D(R4) from the V—V line to the peak M(R4) is smaller than the distance D(R8) from the V—V line to the peak M(R8) as expressed by D(R4)<D(R8). The luminous intensity distribution I(R4)max of the peaks M(R4) at the position downwardly inclined at 4° is set higher than the luminous intensity distribution I(R8)max of the peak M(R8).

In the front close distance region N of the road surface ahead of the vehicle, the downward position at 4° locates at the portion with the low luminous intensity between the peak M(L4) and the peak M(R4). The downward position 8° locates at the portion with the low luminous intensity between the pair of peak M(L8) and the peak M(R8)

The front close distance region N on the road surface ahead of the vehicle is located where the luminous intensity between the pair of peaks M(L4) and M(R4) is low in the case of downwardly inclined position at 4°; and the front close distance region N is located where the luminous intensity between the pair of peaks M(L8) and M(R8) is low in the case of downwardly inclined position at 8°.

As seen from the above, in the second embodiment as well, it is possible to irradiate the lane marks LMs1 and LMc on the opposite sides of the vehicle in a range of about 4 m (extremely close distance) to about 20 m (medium distance) in front of the vehicle by the pair of left and right lane mark irradiation light distribution patterns P(LM-L) and P(LM-R). Further, each of the lane mark irradiation light distribution patterns P(LM-L) and P(LM-R) is set so that the luminous intensity of the portion closer to the H-V point is relatively higher than the luminous intensity of the portion that is away from the H-V point. Thus, it is possible to irradiate the lane marks LMs1 and LMc in the range from the extremely close distance region to the medium distance region with relatively uniform illumination.

Figure 9:
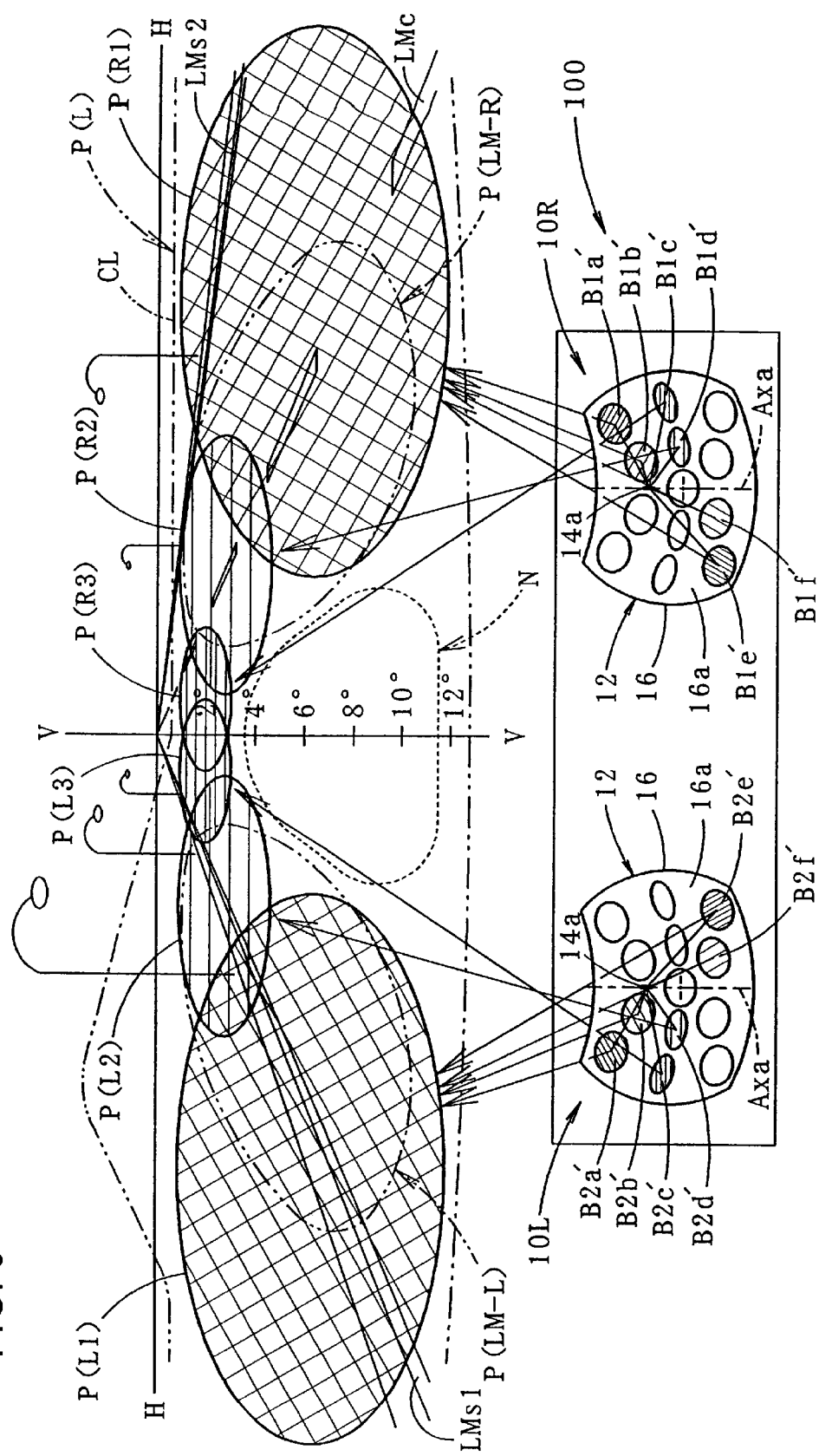
FIG. 9 illustrates the light distribution pattern further formed by the vehicle lamp unit of the present invention.

FIG. 9 shows, still in the second embodiment, the manner to use the reflection regions that are not used for forming the lane mark irradiation light distribution patterns P(LM-L) and P(LM-R) in the lane mark lamps 10L and 10R. In FIG. 9, light distribution patterns widely covers the peripheries of the lane mark irradiation light distribution patterns P(LM-L) and P(LM-R).

In the left lane mark irradiation lamp 10L, the upper left regions B2a' and B2b', the left regions B2c' and B2d' and the lower right regions B2e' and B2f' of the lamp center on the reflection surface 16a of the reflector 16 of the reflector unit 12 diffusion deflection reflect the light from the light source 14a, thereby additionally forming light distribution patterns P(L1), P(L2) and P(L3).

The light distribution pattern P(L1) is remarkably large, which extends leftward in the close distance portion of the lane mark irradiation light distribution pattern P(LM-L), and is formed by reflection light from the upper left regions B2a' and B2b' and the left regions B2e' and B2f'. The light distribution pattern P(L2) is relatively small, which extends slightly rightward in the medium distance portion of the lane mark irradiation light distribution pattern P(LM-L), and is formed by reflection light from the left region B2d'. The light distribution pattern P(L3) is small, which extends rightward to a position exceeding the V—V line in the long distance portion of the lane mark irradiation light distribution pattern P(LM-L), and is formed by the reflection light from the upper left region B2c'.

On the other hand, in the right lane mark irradiation lamp 10R, the upper left regions B1a' and B1b', the right regions B1c' and B1d' and the lower left regions B1e' and B1f' of the light center in the reflection surface 16a of the reflector 16 of the reflector unit 12 diffusion deflection reflect the light from the light source 14a, thereby additionally forming light distribution patterns P(R1), P(R2) and P(R3).

These light distribution patterns P(R1), P(R2) and P(R3) are disposed laterally symmetrically with respect to the light distribution patterns P(L1), P(L2) and P(L3) about the V—V line, and the manner of forming the light distribution patterns is also the same as that of the left lane mark irradiation lamp 10L.

In the embodiment shown in FIG. 9, not only are additionally formed the light distribution patterns P(L1), P(R1), P(L2) and P(R2) on the left and right sides of the front close distance region N in the road surface ahead of the vehicle, but also the light distribution patterns P(L3), P(R3) are additionally formed in the long distance region. Light normally reflected in the far region that is farther than the front close distance region N may reach the driver's eyes of the oncoming vehicle. However, since the distance from the light source 14a is sufficiently long, the amount of the reaching light is not so large. Therefore, even with the light distribution patterns P(L) and P(R3), great glare is not emitted to the oncoming vehicle's driver.

As seen from the above, in the embodiment of FIG. 9, the light distribution patterns P(L1), P(L2) and P(L3) and the light distribution patterns P(R1), P(R2) and P(R3) are formed in addition to the pair of left and right lane mark irradiation light distribution patterns P(LM-L) and P(LM-R). Accordingly, it is possible to extend the lane mark irradiation light distribution patterns P(LM-L) and P(LM-R) in the lateral direction while avoiding light beam irradiation to the front close distance region N of the road surface ahead of the vehicle. Even when the vehicle runs not only on a straight road but also on a curved road, it is possible to reliably irradiate the lane marks LMs1 and LMc on the opposite sides of the vehicle, and it becomes easier to drive the vehicle.

In each of the above embodiments, the lane mark irradiation lamps 10, 10L and 10R are incorporated in the combination headlamp together with the headlamp. However, these lane mark irradiation lights 10, 10L and 10R may be formed separately from the headlamp; and in this case also, the same effect as that of each of the embodiments can be obtained.

Furthermore, in the above-described embodiments, the lane mark irradiation lamps 10, 10L and 10R are combined with the headlamp that is capable of switching light beams between the low beam and the high beam. However the lane mark irradiation lamps 10, 10L and 10R can be combined with a headlamp capable of emitting light beam other than the low beam and the high beam.

In each of the embodiments, a halogen bulb is used as the light source bulb of the lane mark irradiation lamps 10, 10L and 10R and the headlamp 30. The same effect as that of each of the embodiments can be obtained when a discharge bulb or the like is used as the light source bulb.

What is claimed is:

1. A lane mark irradiation vehicle lamp for irradiating a light beam forward with a predetermined light distribution pattern, said vehicle lamp including a means for creating a luminous intensity distribution which is of said light distribution pattern and in lateral direction in a first angle position which is in a downward direction at a predetermined angle with respect to a longitudinal axis passing through a center of a lamp, said light distribution pattern being set so as to have a pair of left and right peaks relative to said longitudinal axis and wherein the lamp serves to form a pair of lane mark irradiation light distribution patterns in a region deviated rightward and leftward from a front close distance region of a road surface ahead of the vehicle.

2. The vehicle lamp according to claim 1, wherein said first angle position is downwardly inclined at 4° with respect to said longitudinal axis.

3. The vehicle lamp according to claim 1, wherein:
   a luminous intensity distribution of said light distribution pattern in a lateral direction in a second angle position which is in a downward direction at a predetermined angle with respect to said first angle position is set so as to have a pair of left and right peaks relative to said longitudinal axis; and
   said pair of peaks of said second angle position are located at positions away from said longitudinal axis with respect to said pair of peaks in said first angle position.

4. The vehicle lamp according to claim 3, wherein said second angle position is downwardly inclined at 8° with respect to said longitudinal axis.

5. The vehicle lamp according to claim 3, wherein luminous intensity of each of said peaks in said first angle position is set higher than luminous intensity of each of said peaks in said second angle position.

6. The vehicle lamp according to claim 1, wherein, when viewed from behind said lamp, said vehicle lamp irradiates a light beam leftward from regions located at an upper right position and a lower left position with respect to said center of said lamp and irradiates a light beam rightward from regions located at an upper left position and a lower right position with respect to said center of said lamp.

7. A lane mark irradiation vehicle lamp unit comprising a left lamp and a right lamp respectively disposed at left and right front ends of a vehicle for irradiating a light beam forward with a predetermined light distribution pattern, said vehicle lamp unit comprising:
   a means for creating a luminous intensity distribution which is of a light distribution pattern formed by said left lamp and in lateral direction in a first angle position which is inclined downward at a predetermined angle with respect to a longitudinal axis passing through a center of said left lamp, said luminous intensity distribution being set so as to have a peak on a left side of said longitudinal axis; and a means for creating a luminous intensity distribution which is of a light distribution pattern formed by said right lamp and in lateral direction in said first angle position, said luminous intensity distribution being set so as to have a peak on a right side of a longitudinal axis passing through a center of said right lamp; and wherein the left lamp irradiates a road surface ahead of the vehicle along a left lane mark, and the right lamp irradiates the road surface ahead of the vehicle along a right lane mark, while avoiding light beam irradiation to a front close distance region of the road surface ahead of the vehicle.

8. The vehicle lamp unit according to claim 7, wherein said first angle position is downwardly inclined at 4° with respect to said longitudinal axis of each of said left lamp and right lamp.

9. The vehicle lamp unit according to claim 7, further comprising:

a means for creating a luminous intensity distribution which is of said light distribution pattern formed by said left lamp and in lateral direction in a second angle position which is downwardly inclined at a predetermined angle with respect to said first angle position, said luminous intensity distribution being set so as to have a peak on said left side of said longitudinal axis, and said peak being positioned on a left side of said peak in said first angle position; and a means for creating a luminous intensity distribution which is of said light distribution pattern formed by said right lamp and in lateral direction in said second angle position, said luminous intensity distribution being set so as to have a peak on said right side of said longitudinal axis, and said peak being positioned on a right side of said peak in said first angle position.

10. The vehicle lamp unit according to claim 9, wherein said second angle position is downwardly inclined at 8° with respect to said longitudinal axis of each of said left lamp and right lamp.

11. The vehicle lamp unit according to claim 9, wherein luminous intensity of each of said peaks in said first angle position is set higher than luminous intensity of each of said peaks in said second angle position.

12. The vehicle lamp unit according to claim 7, wherein:

when viewed from behind said left lamp, said left lamp irradiates a light beam leftward from regions located at an upper right position and a lower left position with respect to said center of said left lamp; and when viewed from behind said right lamp, said right lamp irradiates a light beam rightward from regions located at an upper left position and a lower right position with respect to said center of said right lamp.

* * * * *